US012803283B2

(12) United States Patent
Orr et al.

(10) Patent No.: US 12,803,283 B2
(45) Date of Patent: Nov. 17, 2026

(54) PREVENTION OF REVERSE POWER FLOW INTO ELECTRICAL UTILITY GRID

(71) Applicant: Vermillion Power Technologies Inc., Calgary (CA)

(72) Inventors: Raymond Kenneth Orr, Calgary (CA); Kelly Hall, Calgary (CA); Philip Craine, Sunnyvale, CA (US)

(73) Assignee: Vermillion Power Technologies Inc.

( * ) Notice: Subject to any disclaimer, the term of this patent is extended or adjusted under 35 U.S.C. 154(b) by 207 days.

(21) Appl. No.: 18/298,040

(22) Filed: Apr. 10, 2023

(65) Prior Publication Data

US 2024/0339836 A1 Oct. 10, 2024

(51) Int. Cl.
*H02J 3/06* (2026.01)
*H02J 3/0012* (2026.01)
*H02J 3/38* (2026.01)

(52) U.S. Cl.
CPC .............. *H02J 3/06* (2013.01); *H02J 3/0012* (2020.01); *H02J 3/381* (2013.01)

(58) Field of Classification Search
None
See application file for complete search history.

(56) References Cited

U.S. PATENT DOCUMENTS

2002/0079741 A1* 6/2002 Anderson ................. H02J 9/08 307/64
2010/0312409 A1* 12/2010 Zeumer ................... H02J 3/381 700/287
2017/0179847 A1* 6/2017 Porter ..................... H02M 7/44
2021/0408823 A1* 12/2021 Richmond ................ H02J 3/32
2023/0013208 A1* 1/2023 Hastings ................. H02J 9/068
2023/0063466 A1* 3/2023 Madonna ................ H02J 3/001

* cited by examiner

*Primary Examiner* — Regis J Betsch
*Assistant Examiner* — Joel Barnett
(74) *Attorney, Agent, or Firm* — David R. Stevens; Stevens Law Group

(57) ABSTRACT

The present disclosure relates to prevention of reverse power flow into an electrical utility grid. An electrical circuit connector is for connection to an electrical circuit that includes one or more electrical loads and one or more electrical power sources to provide electrical power to the electrical load(s). An electrical grid connector is for connection to an electrical utility grid. A connection state between the electrical grid connector and the electrical circuit connector is controlled based on respective voltages, at the electrical circuit connector and at the electrical grid connector, and a state of power flow between the electrical grid connector and the electrical circuit connector.

11 Claims, 5 Drawing Sheets

100

PREVENTION OF REVERSE POWER FLOW INTO ELECTRICAL UTILITY GRID

FIELD

The present application relates generally to electrical power systems, and in particular to prevention of reverse power flow from a grid-connected electrical circuit into an electrical utility grid.

BACKGROUND

Power flow control in systems that are connected to a utility grid and that include alternating current (AC) power sources typically involves grid-tie switches. These grid-tie switches are used to prevent power from flowing into the utility grid when the grid has failed or AC power is otherwise not available from the grid. This type of power flow prevention is also known as anti-islanding. Grid-tie switches prevent power from flowing from the AC sources into the grid and creating an "island" of the grid that is powered by the AC sources. This powered island of the utility grid is potentially dangerous to service personnel who expect the grid to be un-powered, for example.

Although grid-tie switches can provide some level of protection from AC sources powering a utility grid or parts of such a grid, improved approaches to reverse power flow prevention are desirable.

SUMMARY

The present disclosure encompasses reverse power flow prevention that differs from grid-tie switch approaches in that reverse power flow can be prevented even if a utility grid has not failed and is still capable of supplying at least some power to connected electrical systems. Power can be prevented from flowing from a grid-connected electrical circuit, which includes one or more electrical power sources and one or more electrical loads, into a utility grid. Embodiments disclosed herein may allow the electrical load(s) to be powered from either or both of the utility grid and the local power source(s), without the risk of reverse power flow from the local power source(s) to the grid.

According to one aspect of the present disclosure, an apparatus includes a controllable switch and a power flow controller. The controllable switch is coupled between an electrical circuit connector for connection to an electrical circuit that includes an electrical load and an electrical power source to provide electrical power to the electrical load, and an electrical grid connector for connection to an electrical utility grid. The power flow controller is coupled to the controllable switch, to control a connection state between the electrical grid connector and the electrical circuit connector, by controlling the controllable switch based on respective voltages at the electrical circuit connector and at the electrical grid connector and a state of power flow between the electrical grid connector and the electrical circuit connector.

Another aspect of the present disclosure relates to a method that involves determining respective voltages at an electrical circuit connector for connection to an electrical circuit that includes an electrical load and an electrical power source to provide electrical power to the electrical load, and at an electrical grid connector for connection to an electrical utility grid; determining a state of power flow between the electrical grid connector and the electrical circuit connector; and controlling a connection state between the electrical grid connector and the electrical circuit connector based on the respective voltages at the electrical circuit connector and at the electrical grid connector and the state of power flow.

Other aspects and features of embodiments of the present disclosure will become apparent to those ordinarily skilled in the art upon review of the following description.

BRIEF DESCRIPTION OF THE DRAWINGS

Embodiments will be described, by way of example only, with reference to the accompanying drawings.

DETAILED DESCRIPTION

Figure 1:
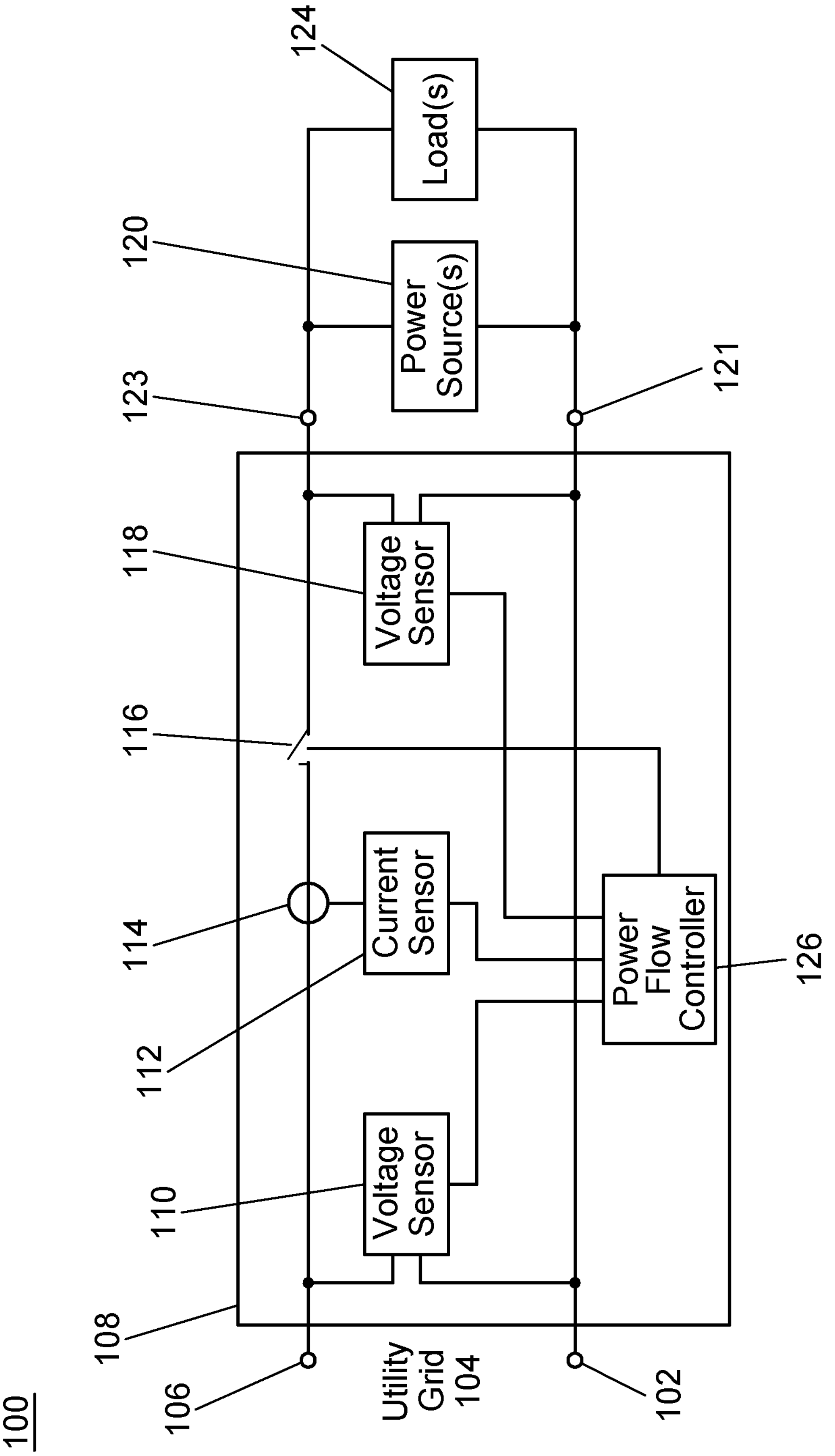
FIG. 1 is a block diagram illustrating an example electrical power system in which flow control according to an embodiment may be implemented.

According to embodiments disclosed herein, reverse power flow prevention may be provided by a power flow control system connected between an electrical utility grid and an electrical circuit that includes one or more electrical power sources and one or more electrical loads. For ease of reference, an electrical utility grid may also be referred to herein as an electrical grid, a utility grid, or a grid. An electrical circuit may also be referred to herein as a local electrical circuit or a local circuit.

A power flow control system may include respective voltage sensors for sensing grid voltage, at an electrical grid connector for connection to an electrical utility grid for example, and local circuit or load voltage, at an electrical circuit connector for connection to a local electrical circuit for example, that is being supplied to one or more electrical loads in the local electrical circuit. As described in further detail at least below, the grid voltage and the local circuit voltage are used in determining whether a connection state between the utility grid and the local circuit, or equivalently between a grid connector and a local circuit connector for example, is to be maintained or changed. If a switch between the connectors is open, for an open connection state for example, and the grid voltage is greater than the voltage that is being applied to the load(s) by the power source(s) in the local circuit, then the switch may be controlled to close and connect the grid to the local circuit, thereby changing the connection state from an open connection to a closed connection.

Such a system may also include a current sensor for sensing current that is flowing from the utility grid. In some embodiments, the current and voltage sensing information is used to determine whether power that is flowing from the utility grid to the local electrical circuit is approaching zero. If power flowing from the utility grid approaches zero, a switch is controlled to open and disconnect the grid from the local circuit, thereby changing the connection state from a closed connection to an open connection.

With both voltage and current sensing, automatic control of switch opening and closing can be provided in such a way that power from local circuit power sources is prevented from flowing into a utility grid. The power source(s) in a local circuit will source power to supply the load(s) in the local circuit only when voltage is not applied from the grid and the switch is open in the open connection state between the grid and the local circuit, or when the switch is closed in the closed connection state between the grid and the local circuit and power flow is from the grid to the local electrical circuit. Put another way, with power flow control as disclosed herein to transition to the open connection state when power flow from the grid to the local circuit is approaching zero, the power source(s) in the local circuit will not source power to the grid.

These and other features are described in detail herein, at least below.

FIG. 1 is a block diagram illustrating an example electrical power system 100 in which flow control according to an embodiment may be implemented. The example system 100 includes a power flow control system 108 and a local electrical circuit. The power flow control system 108 is illustrative of how power flow control, including reverse power flow prevention, may be implemented in one embodiment. The power flow control system 108 is operative to prevent reverse power flow from the local electrical circuit, which includes one or more electrical load(s) 124 coupled to one or more power source(s) 120 for providing electrical power to the load(s), to the utility grid 104.

The power flow control system 108 include an electrical grid connector at the left in FIG. 1, for connection to the utility grid 104, and an electrical circuit connector at the right, for connection to the local electrical circuit. A controllable switch 116 is coupled between the electrical circuit connector and the electrical grid connector. The power flow control system 108 also includes voltage sensors 110, 118, a current sensor 112 coupled to a current sense element 114, and a power flow controller 126 coupled to the voltage sensors, the current sensor, and the controllable switch 116.

FIG. 1 illustrates an electrical grid connector by way of example as terminals 102 and 106. The terminals 102, 106 represent one example implementation of a connector by which or through which a power flow control system 108, and a local electrical circuit connected thereto as shown in FIG. 1, may be electrically connected or coupled to a utility grid 104. Other types of connectors, which may or may not necessarily include components in the specific form of terminals, may be provided in other embodiments.

An electrical circuit connector is also provided at the right of the power flow controller 108 in FIG. 1, for connection to the local electrical circuit that includes the power source(s) 120 and the electrical load(s) 124. Although shown in FIG. 1 by way of example as terminals 121, 123, in other embodiments other forms of electrical circuit connectors may be provided.

For example, a connector may be or include any of various types of electrical connections, terminals, or devices for connection to a utility grid 104 or to a local electrical circuit. An electrical grid connector or an electrical circuit connector may be or include not only mating type connectors, but also or instead other types of elements or components that can be wired to or otherwise coupled to an electrical utility grid or to a local electrical circuit, such as terminals (as shown by way of example in FIG. 1), punch down connectors, terminal blocks, etc.

Power flow control as disclosed herein is not in any way restricted to particular types of electrical grid connectors at 102, 106 or electrical circuit connectors at 121, 123, or to embodiments in which an electrical grid connector and an electrical circuit connector are of the same type.

In the example shown, there are two voltage sensors 110, 118. These voltage sensors may be implemented in any of various ways, as will be apparent to those familiar with power electronics and power control. Some embodiments may include two voltage sensors as shown, and in other embodiments one voltage sensor is coupled across multiple pairs of terminals or nodes and is capable of measuring multiple voltages. The present disclosure is not limited to any particular type, or number, of voltage sensors.

The current sense element 114 may be implemented using, for example, a current shunt or a current transformer. The current sensor 112 is intended to represent a component by which a signal from current sense element 114 is processed in some way, as described by way of example at least below. For example, a current sense signal may be scaled and filtered by the current sensor 112, and these features may be implemented using power electronics for example. The exact form of the current sensor 112 is dependent upon the features that are to be supported. Embodiments disclosed herein are not in any way dependent upon particular types of current sense elements or current sensors.

Although the example shown in FIG. 1 includes a current sense element 114 and a current sensor 112, it should be appreciated that this is an illustrative embodiment. Alternatively, the current sense element 114 may be comprised of resistance in series with the controllable switch 116 to generate a potential difference between the voltage sensors 110, 118, where the potential difference between the voltage sensors and the potential drop across the resistance is used to determine the current. The resistance in this example may in fact be wiring and switch resistance between the voltage sensors 110, 118, in which case no current sense element 114 or current sensor 112 may be implemented. More generally, current sensing may, but need not necessarily, be implemented separately from voltage sensing, because current may be determined in some embodiments from sensed voltages.

The controllable switch 116, as also discussed in detail at least below, enables connection of the local electrical circuit to, and disconnection of the local electrical circuit from, the utility grid 104. Examples of switches that may be used to implement the controllable switch 116 include relays, solid state switches such as Metal Oxide Semiconductor Field Effect Transistors (MOSFETs), and triacs. As noted for other components in FIG. 1, embodiments are not limited to any particular type of switch.

The power flow controller 126 may be implemented, entirely or partially, using hardware, firmware, processing devices that execute software, or some combination thereof. Microprocessors, Application Specific Integrated Circuits (ASICs), Field Programmable Gate Arrays (FPGAs), and Programmable Logic Devices (PLDs) are examples of processing devices that may be used to execute software stored in memory. Features of the power flow controller 126, which are described in detail at least below, may be provided or supported in other ways, and the present disclosure is not in any way limited to processing device-based implementation of a power flow controller such as 126.

Other components in a power flow control system, such as one or more voltage sensors or a current sensor, may also or instead be implemented using the same processing device or one or more separate processing devices.

Finally, in the local electrical circuit, the power source(s) 120 and electrical load(s) 124 may be or include any of various types of electrical power sources and loads. Power sources that may be connected to the utility grid 104 would be AC power sources, but may be implemented in any of various ways, to supply power to any of various types of loads. For example, a power source 120 may be or include a battery or other direct current (DC) power source with an inverter to convert to AC, or an AC power source that generates AC power without requiring conversion from DC. Although a power source 120 is provided to supply power to the load(s) 124, the power source may also consume power under certain conditions. For example, a power source 120 may be or include a rechargeable power storage device that is recharged from the utility grid 104. The load(s) 124 may include, for example, one or more typical household electrical loads.

It should be appreciated that the power control system 100 is an illustrative and non-limiting example. Other embodiments may include fewer, additional, and/or different elements, interconnected in a similar way or a different way than shown.

Turning now to operation, the first voltage sensor 110 determines the voltage from the utility grid 104 at the grid connector, represented by way of example in FIG. 1 by the terminals 102 and 106, and the second voltage sensor 118 determines the voltage at the electrical circuit connector, represented in FIG. 1 by the terminals 121 and 123. As also noted at least above, a single voltage sensor may be provided and coupled to the power flow controller 126, to determine the voltage at the electrical grid connector and the voltage at the electrical circuit connector.

Utility grid current, between the electrical grid connector and the local circuit connector, is sensed at the current sense element 114 in the example shown, but may be determined in other ways as described at least above. A current sense signal from the current sense element is processed, by scaling and/or filtering for example, the current sensor 112. The current sensor 112 is therefore an example of a component to determine the current between the electrical grid connector and the local circuit connector.

Although a current sense element 114 and a current sensor 112 are shown separately in FIG. 1, current sensing may be implemented or provided by fewer elements, such as an ammeter that senses current and provides an output signal that is indicative of the sensed current.

Electrical parameter sensing need not necessarily be distributed between multiple sensors as shown. Voltage sensing and current sensing may involve different techniques, but in some embodiments sense signals from multiple sensing elements may be received by a single sensor device or module for optional processing such as scaling and/or filtering, for example. In some embodiments, power sensing may be implemented, using a power sensor for example, that determines power flow and provides a power flow measurement to the power flow controller. The present disclosure is not in any way limited to any particular sensing architecture or implementation.

The power flow controller 126 controls a connection state between the electrical grid connector and the local circuit connector, by controlling the controllable switch 116 based on at least the respective voltages at the electrical circuit connector and at the electrical grid connector and a state of power flow between the electrical grid connector and the local circuit connector. Current and voltage sensing information is used by the power flow controller 126 in some embodiments to determine whether power is flowing from the utility grid 104 or is approaching zero, and the power flow controller 126 may then provide a control signal to control the controllable switch 116 and thus a connection state between the electrical grid connector and the local circuit connector based on, in this example, calculated power and the determination as to whether power is flowing or approaching zero.

As discussed in additional detail by way of example at least below, under a state of no power flow with the controllable switch 116 in an open position, the power flow controller 126 may control the switch based on the respective voltages at the electrical grid connector and the local circuit connector. The power flow controller 126 may determine that the controllable switch 116 is open and the state of power flow is no power flow between the electrical grid connector and the local circuit connector in any of various ways. For example, the controllable switch 116 may be configured to provide a state indication to the power flow controller 126, or the power flow controller may itself be configured to track whether it has most recently controlled the controllable switch to open or close.

In short, if the controllable switch 116 is open and the power flow state is no power flow between the electrical grid connector and the local circuit connector, then the power flow controller 126 may control the switch based on the respective voltages at the electrical grid connector and the local circuit connector. Some embodiments may involve determining current and power flow for the purpose of controlling the controllable switch 116, but it should be appreciated that current need not necessarily be used in all embodiments of switch control.

Another power flow state is a state of positive power flow from the electrical grid connector to the electrical circuit connector, with the controllable switch 116 in a closed position. Under this power flow condition, the power flow controller 126 controls the connection state by controlling the controllable switch 116 based on not only the respective voltages at the electrical grid connector and the local circuit connector, but further based on the current between the electrical grid connector and the electrical circuit connector with the switch in a closed position. In particular, according to embodiments disclosed herein, the power flow controller 126 controls the connection state by controlling the controllable switch 116 based on a calculation of power from the respective voltages at the connectors, and the current. The power flow controller 126 may itself be configured to calculate the power from the respective voltages and the current, or in other embodiments a power flow calculator may be coupled to the power flow controller, to calculate the power from the respective voltages and the current. Thus, the power flow controller 126 may perform a power calculation, or may include or be coupled to a power flow calculator. For example, power sensing using a power sensor is referenced at least above, and such a power flow sensor that senses power flow and provides and indication of power flow may be considered to be a form of power flow calculator. Power sensing or calculation may involve sensing voltage and current, and accordingly power flow sensing may also be considered to be based on current and the respective voltages at the electrical grid connector and the electrical circuit connector. This is further illustrative of how embodiments are not restricted to only an implementation as shown in FIG. 1 or any other specific division of function or features.

Embodiments may allow power to be supplied to the electrical load(s) 124 from the utility grid 104 and possibly also the power source(s) 120, when the controllable switch 116 is closed and the power flow state is a state of positive power flow from the electrical grid connector to the local circuit connector, or from the power source(s) 120 when the controllable switch 116 is open and the power flow state is a state of no power flow from the electrical grid connector to the local circuit connector. If power is flowing from the utility grid 104 but approaches zero, then the power flow controller 126 controls the controllable switch 116 to open, by signaling the switch to open for example. If the controllable switch 116 is open and one or more switch closing conditions are satisfied, then the power flow controller 126 controls the controllable switch 116 to close, by signaling the switch to close for example. Signaling the controllable switch 116 may also or instead be referred to as providing a control signal to the switch. In the case of controlling the controllable switch 116 to open, the control signal may be referred to as an "open" control signal. Similarly, in the case of controlling the controllable switch 116 to close, the control signal may be referred to as a "close" control signal.

Under a power flow state of no power flow, with the controllable switch 116 open, the power flow controller 126 uses voltage information related to the respective voltages at the grid connector and the local circuit connector, from the voltage sensors 110, 118 in the example shown in FIG. 1, to determine whether to maintain the switch in its open position or to control the switch to close. One example of a switch closing condition that may be applied by the power flow controller 126 is utility grid voltage at the grid connector being greater than the voltage applied to the load(s) 124 by the power source(s) 120, which can be sensed at the local circuit connector by the voltage sensor 118 in the example shown in FIG. 1. Another example of a switch closing condition that may also or instead be used in some embodiments is the respective voltages at the grid connector and the local circuit connector being substantially equal and the slopes of the voltages being of the same polarity.

Responsive to a switch closing condition being satisfied, such as when the grid voltage at the grid connector is greater than the local circuit voltage at the local circuit connector or when the respective voltages are substantially equal and have slopes that are of the same polarity in the above examples, the power flow controller 126 controls the controllable switch 116 to close. Otherwise, when the controllable switch 116 is in an open position and a switch closing condition is not satisfied, the switch is maintained in the open position. Maintaining the controllable switch 116 in an open position may involve providing a control signal to the switch to keep it open, or not providing a control signal to the switch so that it does not transition from open to closed position. In either case, it is the power flow controller 126 that controls the connection state between the grid connector and the local circuit connector, based on the respective voltages at the connectors in these examples.

These examples illustrate operation of the power flow controller 126 to control connection state between the connectors by maintaining the connection state of an open connection with the controllable switch 116 in an open position where the respective voltages at the connectors, and the state of power flow (which is no power flow with the switch open in these examples) do not satisfy a condition for the local circuit to be connected to the utility grid 104, or by changing the connection state of an open connection to a closed connection with the switch in a closed position where the respective voltages and the state of power flow (which again is no power flow with the switch open) satisfy a condition for the local circuit to be connected to the utility grid.

Turning now to the power flow state of positive power flow, with the controllable switch 116 in the closed position, the power flow controller 126 receives voltage information about the respective voltages at the connectors and current information related to current flow between the connectors, from the voltage sensors 110, 118 and the current sensor 112 in the example shown in FIG. 1. This information is, in some embodiments, in the form of multiple samples in time, of voltage waveforms and a current waveform. The power flow controller 126, or a power flow calculator coupled thereto, uses the voltage information and the current information to calculate power. Power calculations from the voltage information and the current information can be done in any number of ways. For example, apparent power can be determined by multiplying the voltage information by the current information on a point by point basis, and then calculating the root mean square (RMS) value. From the apparent power, and phase angle between each voltage waveform and the current waveform, power can be determined using the Pythagorean theorem to determine the length of a power vector. Calculated power can be used to determine whether, and when, to open the controllable switch 116.

With the controllable switch 116 in the closed position, the respective voltages at the connectors is substantially the same, apart from a voltage drop across connection and switch impedance between the connectors. Thus, power may be determined in some embodiments based on a measurement of either of the respective voltages when the controllable switch 116 is closed. In this case, the voltage upon which a power determination is based may be the voltage at one connector but is also substantially the same as the voltage at the other connector, and in at least this sense the power determination and subsequent switch control may still be considered or characterized as being based on the respective voltages at the connectors.

Responsive to a switch opening condition being satisfied, such as when calculated power drops below a threshold, the power flow controller 126 controls the controllable switch 116 to open. Otherwise, when the controllable switch 116 is in a closed position and a switch opening condition is not satisfied, the switch is maintained in the closed position. Maintaining the controllable switch 116 in its present position, which is closed in the case of positive power flow, may involve providing a control signal to the switch to keep the switch closed or not providing a control signal to the switch so that it does not transition from closed to open position. Whether the controllable switch 116 is to be maintained in its present position, which is closed in this example, or transitioned to a different position, which is open in this example, it is the power flow controller 126 that controls the connection state between the grid connector and the local circuit connector, based on the respective voltages at the connectors, and further based on current flow between the connectors, in these examples.

These examples illustrate operation of the power flow controller 126 to control connection state between the connectors by maintaining the connection state of a closed connection with the controllable switch 116 in a closed position where the respective voltages and the positive state of power flow satisfy a condition for the local circuit to remain connected to the utility grid 104, or by changing the connection state to an open connection with the controllable switch in an open position where the respective voltages and the state of power flow do not satisfy a condition for the local circuit to remain connected to the utility grid.

Switch control and operation of the power flow controller 126 and the controllable switch 116 will be further described below with reference to FIGS. 2, 3, and 4.

Figure 2:
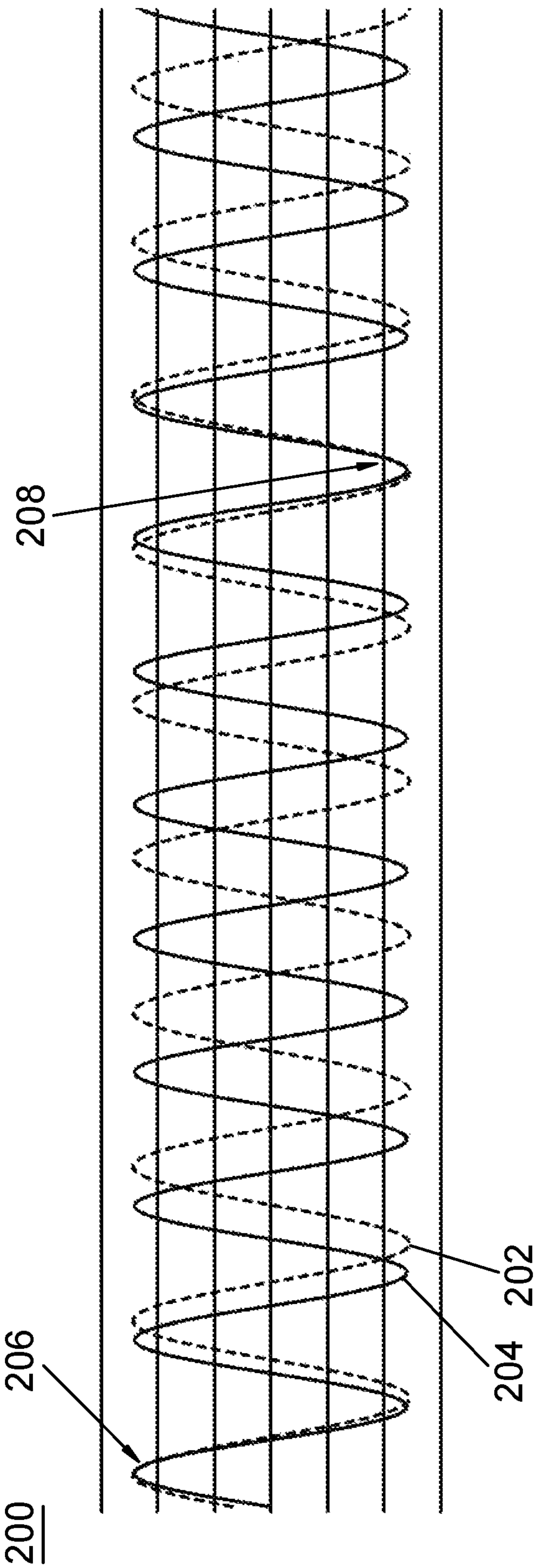
FIG. 2 includes plots of utility grid potential and local electrical circuit potential versus time.

FIG. 2 includes plots, referenced generally by 200, of utility grid potential (voltage) at 202 and local electrical circuit potential (voltage) at 204 versus time. These AC potentials are at the utility grid 104 and the power source(s) 120 in FIG. 1, and are substantially sinusoidal. The voltages may vary between zero and ±120 V, for example, but embodiments are not in any way restricted to these or any other ranges of voltage.

A first crossing point at 206 and a second crossing point 208 show two example points where the respective voltages at a grid connector and a local circuit connector are substantially equal and the slopes of both sine waves have the same polarity. This is an example of a switch closing condition described herein. Under a power flow state of no power flow, the power flow controller 126 in FIG. 1 may detect such a crossing point between the respective connector voltages and control the controllable switch 116 to close responsive to detecting a crossing point and remain open unless and until a crossing point is detected.

Figure 3:
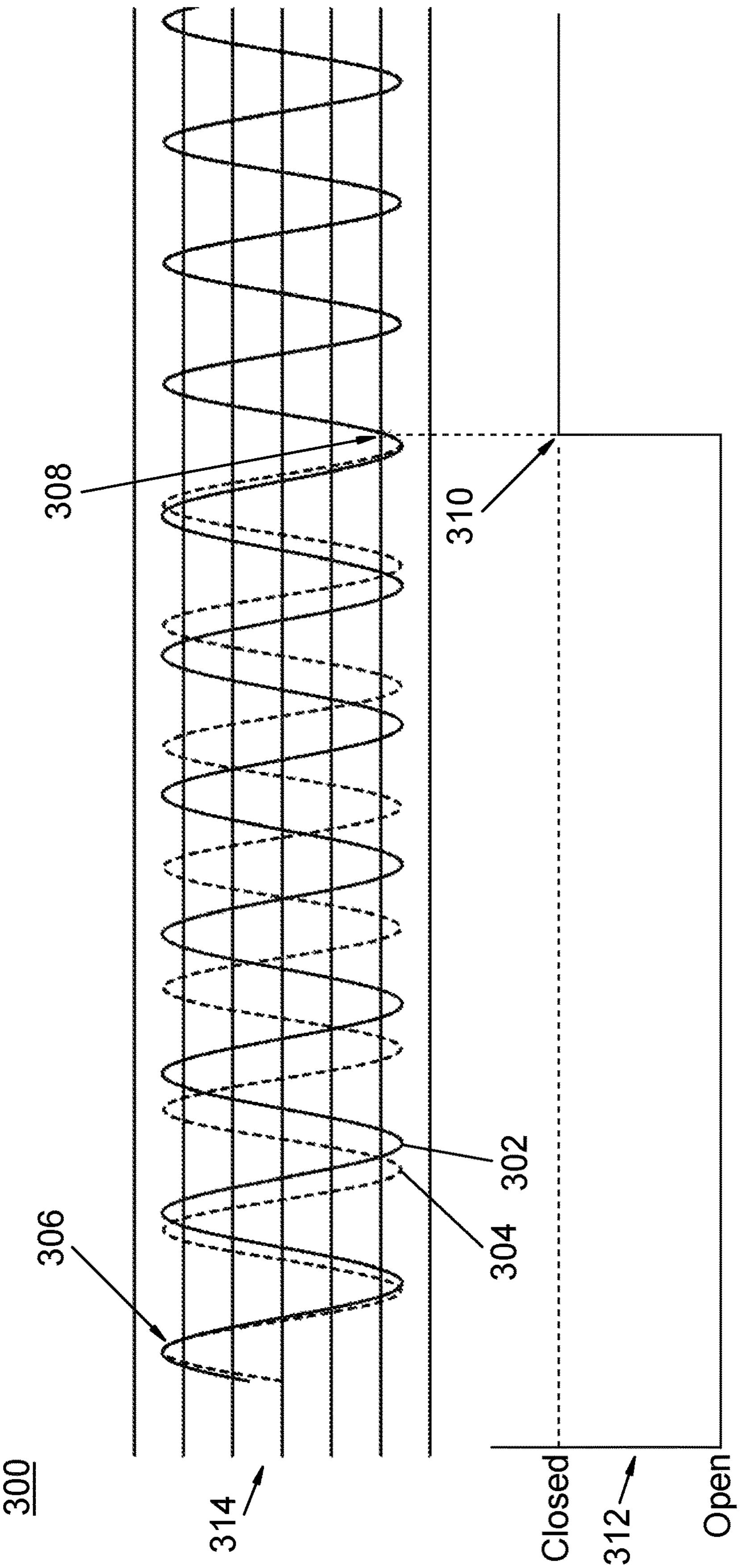
FIG. 3 includes plots of utility grid potential, local electrical circuit potential, and connection state of a local electrical circuit versus time, during a time interval in which the connection state transitions from an open connection state to a closed connection state.

This is shown by way of example in FIG. 3, which includes plots that are generally referenced by 300. The plots 314 at the top include a plot 302 of utility grid potential (voltage) versus time, a plot 304 of local electrical circuit potential (voltage) versus time, and a plot 312 at the bottom is a plot of connection state of a local electrical circuit versus time, during a time interval in which the connection state transitions from an open connection state to a closed connection state. As in FIG. 2, the voltages in the plots 314 in FIG. 3 may vary between zero and ±120 V, for example, but embodiments are not in any way restricted to these or any other ranges of voltage.

The AC potentials from the utility grid at 302 and the local circuit power source(s) at 304 have crossing points 306, 308 where grid connector voltage and local circuit connector voltage are substantially equal and the slopes of both waveforms have the same polarity. At 310, FIG. 3 shows the transition from open to closed connection state, responsive to detection of crossing point 308 by the power controller 126 and control of the controllable switch 116 in FIG. 1 to transition from open to closed for example.

Other switch closing conditions may also or instead be used to determine when to change connection state from open to closed, and thereby connect a local circuit to a utility grid.

After the connection state transitions to closed at 310, by closing the controllable switch 116 in FIG. 1 for example, the potentials of both the utility grid (104 in FIG. 1, for example) and the local circuit (including the power source(s) 120 in FIG. 1, for example) align as shown. Sine wave 302 and sine wave 304 in FIG. 3 are substantially equal and in phase. The frequency of the local circuit potential, and the power source(s) 120 in FIG. 1 for example, is pulled to the grid frequency of sine wave 302. In this way, the potential at the local circuit connector (at the terminal 123 in FIG. 1 for example) will be substantially the same as the potential at the grid connector (at the terminal 106 in FIG. 1 for example).

Under a power flow state of positive power flow and a closed connection state, the power flow controller 126 in FIG. 1 may control the controllable switch 116 to open in order to prevent reverse power flow from the local circuit, and in particular the power source(s) 120, into the utility grid 104. This is illustrated by way of example in FIG. 4, which includes plots, generally referenced by 400, of power flow versus time at 412, and connection state of a local electrical circuit versus time at 410. The plots 412, 410 in FIG. 4 illustrate power and connection state, respectively, during a time interval in which the connection state transitions from a closed connection to an open connection at 408.

At 402, power is flowing from utility grid 104 of FIG. 1 to the local circuit through the closed controllable switch 116, but is decreasing. At 404, this positive power flow from the utility grid to the local circuit is approaching zero. By way of example, a power threshold for connection state transition from closed to open may be 100 mW. This is an example only, and other minimum power thresholds may be used in other embodiments.

Figure 4:
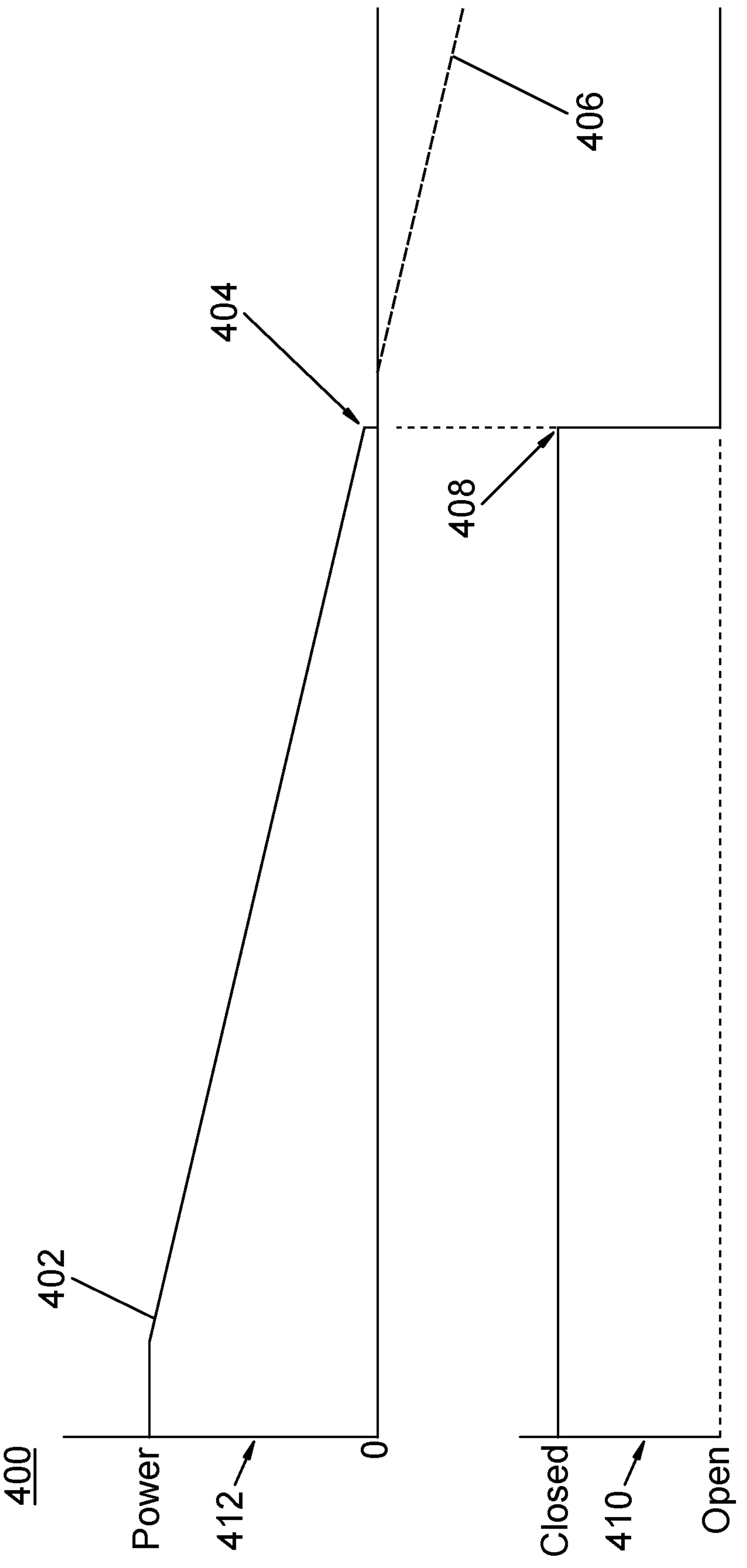
FIG. 4 includes plots of power flow and connection state of a local electrical circuit versus time, during a time interval in which the connection state transitions from a closed connection state to an open connection state.

At 408, FIG. 4 indicates a transition from closed to open connection state, by the power flow controller 126 controlling controllable switch 116 in FIG. 1 to open for example. In such an embodiment, the power flow controller 126 controls the controllable switch 116 to transition from closed to open at 408, responsive to power flow being at or below a minimum threshold and approaching zero. Thus, opening the controllable switch 116 at 408, when power flow is still positive, prevents power flow from following trajectory 406, which illustrates power flow below zero. Positive power values at 412 in FIG. 4 are associated with power flow from an electrical grid connector to an electrical circuit connector. Negative power values at 412 in FIG. 4 are associated with power flow from an electrical circuit connector to an electrical grid connector, which is also referred to herein as reverse power flow. Therefore the part of the trajectory 406 that extends below zero power 412 in FIG. 4 represents power flowing from a local circuit to a utility grid. In the example shown in FIG. 1, power flow control to prevent power flow from following the trajectory 406 this would prevent power from flowing from the power source(s) 120 to utility grid 104.

Power flow control consistent with the present disclosure may involve any of various actions or operations, of which some may but not all need necessarily involve changing connection state or switch position. For example, power flow control may involve any one or more of the following:

- maintaining an open connection state with a power switch in an open position, where the power switch is open and one or more connection state or switch closing conditions are not satisfied (or one or more conditions for maintaining an open connection state and switch position are satisfied);
- controlling an open power switch to transition to closed position to change connection state from open to closed, where the power switch is open and one or more connection state or switch closing conditions are satisfied (or one or more conditions for maintaining an open connection state and switch position are not satisfied);
- maintaining a closed connection state with a power switch in a closed position, where the power switch is closed and one or more connection state or switch opening conditions are not satisfied (or one or more conditions for maintaining a closed connection state and switch position are satisfied);
- controlling a closed power switch to transition to open position to change connection state from closed to open, where the power switch is closed and one or more connection state or switch opening conditions are satisfied (or one or more conditions for maintaining a closed connection state and switch position are not satisfied).

A power flow control cycle may progress through multiple states, actions, or operations. When a power flow control system is first connected between a utility grid and a local electrical circuit, for example, its power switch will likely be in an open position. The connection state and power switch may be maintained open until one or more closing conditions are satisfied (or one or more conditions to maintain open are not satisfied), and then controlled to transition to closed responsive to the closing condition(s) being satisfied (or the condition(s) to maintain open no longer being satisfied). The connection state and power switch may then be maintained closed until one or more opening conditions are satisfied (or one or more conditions to maintain closed are not satisfied), and then controlled to transition to open responsive to the opening condition(s) being satisfied (or the condition(s) to maintain closed no longer being satisfied). This power flow control cycle may repeat during the service life of a power flow control system, as a utility grid is affected by outages and recovers from such outages for example.

Opening, closing, maintaining open, and maintaining closed condition(s) need not be the same or even related to each other. For example, in some embodiments a power switch may be controlled to open when only one condition (for example, power flow approaching zero) is satisfied, whereas the power switch is controlled to close only when all of multiple conditions (for example, connector voltages are substantially the same and have the same slope) are satisfied.

Default control actions are also contemplated. For example, in the case of an open switch, it may be preferable for safety to maintain a power switch open (and safe) than to close the switch if all switch closing conditions are not satisfied.

Embodiments are described above primarily in the context of power circuits or components thereof. Method embodiments are also possible.

Figure 5:
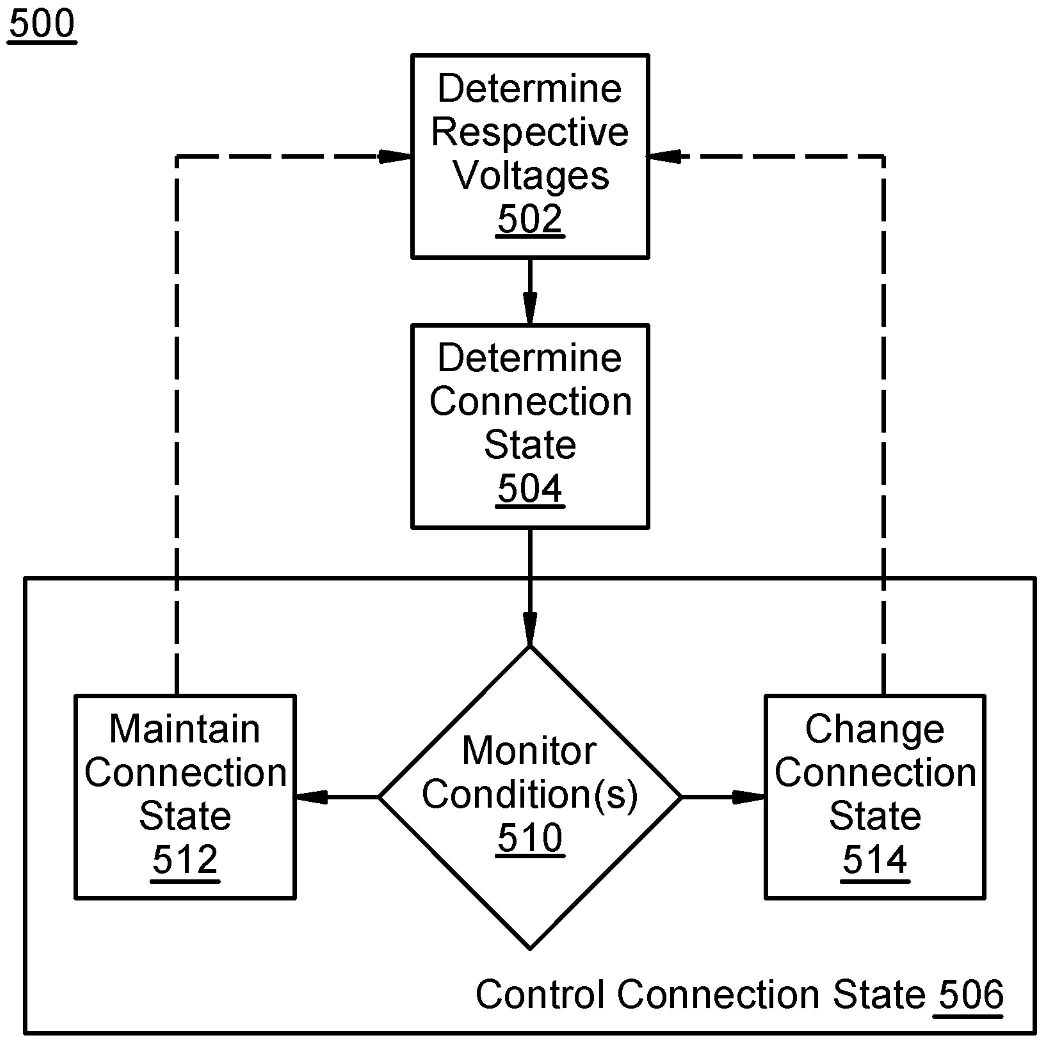
FIG. 5 is a flow diagram illustrating an example method according to an embodiment.

FIG. 5 is a flow diagram illustrating an example method 500 according to an embodiment.

The example method 500 involves, at 502, determining respective voltages at an electrical circuit connector and at an electrical grid connector. As described in detail elsewhere herein, with reference to FIG. 1 for example, an electrical grid connector is for connection to an electrical utility grid and an electrical circuit connector is for connection to an electrical circuit that includes an electrical load (or multiple electrical loads) and an electrical power source (or multiple electrical power sources) to provide electrical power to the electrical load(s).

At 504, FIG. 5 illustrates determining a state of power flow between the electrical grid connector and the electrical circuit connector. As described in detail elsewhere herein, control of a connection state between the electrical grid connector and the electrical circuit connector (by controlling a controllable switch 116 (FIG. 1) that is coupled between the electrical circuit connector and the electrical grid connector for example) may be different, depending upon whether the state of power flow is a state of no power flow with the controllable switch in an open position or a state of positive power flow from the electrical grid connector to the electrical circuit connector with the controllable switch in a closed position. Such a controllable switch may be configured to provide a state indication, in which case the state of power flow may be determined based on the state indication. In another embodiment, control history may be tracked, and the state of power flow may be determined based on whether such a controllable switch was most recently controlled to open or close.

Controlling the connection state between the electrical grid connector and the electrical circuit connector based on the respective voltages at the electrical circuit connector and at the electrical grid connector and the state of power flow is generally represented at 506.

Determining the voltages at 500 may involve, in some embodiments, sensing the respective voltages. The voltages may be sensed using one or more voltage sensors, as described at least above with reference to FIG. 1, for example, in which case determining the respective voltages may involve receiving signals indicative of the respective voltages from one or more voltage sensors.

Although not explicitly shown in FIG. 1, some embodiments may involve determining current between the electrical grid connector and the electrical circuit connector. The current may be sensed or otherwise determined. A current sense signal that is indicative of sensed current may be received from a current sensor for example. Controlling the connection state at 506 may involve controlling the connection state further based on the current between the electrical grid connector and the electrical circuit connector with a controllable switch such as the controllable switch 116 (FIG. 1) in a closed position, for example.

Controlling connection state at 506 may involve controlling the connection state based on a determination of power from the respective voltages and the current. A method may involve determining the power from the respective voltages and the current, or receiving an indication of power that was sensed or otherwise determined, by a power calculator such as a power sensor for example.

Controlling the connection state between the connectors may involve maintaining a present connection state as shown at 512 or changing the present connection state at shown at 514. At 510, FIG. 5 generally represents determining whether one or more conditions are satisfied, and 512, 514 represent subsequent power flow control based on whether a condition, or multiple conditions, are or are not satisfied.

For example, controlling the connection state may involve maintaining the connection state of an open connection at 512 where it is determined at 510 the respective voltages and the state of power flow (which is no power flow for the case of an open connection) do not satisfy one or more conditions for the electrical circuit to be connected to the electrical utility grid, or changing the connection state of an open connection to a closed connection at 514 where it is determined at 510 that the respective voltages and the state of power flow (which again is no power flow with the switch open) satisfy one or more conditions for the electrical circuit to be connected to the electrical utility grid.

For a present connection state of a closed connection with a controllable switch such as the controllable switch 116 (FIG. 1) in a closed position, the controlling may involve maintaining the connection state of a closed connection at 512 where it is determined at 510 that the respective voltages and the state of power flow satisfy one or more conditions for the electrical circuit to remain connected to the electrical utility grid, or changing the connection state to an open connection at 514 with the controllable switch in an open position where it is determined at 510 that the respective voltages and the state of power flow do not satisfy one or more conditions for the electrical circuit to remain connected to the electrical utility grid.

Various examples of conditions that may be assessed at 510 for maintaining a connection state at 512 or changing the connection state at 514 are provided at least above. These examples also apply to method embodiments.

As also described at least above, a power flow control cycle may progress through multiple states, actions, or operations, and the dashed return paths from 512, 514 to 502 in FIG. 5 are intended to represent that power flow control need not necessarily be a one-time event, and may be ongoing. Parameters such as the respective voltages, current, power, and power flow state may be monitored to determine at 510 whether one or more conditions to maintain or change state are satisfied or not satisfied. Control may then proceed to maintain present connection state at 512 or change present connection state at 514 and continue or resume monitoring.

FIG. 5 is an example method. The illustrated operations may be provided or supported in any of various ways, and other embodiments may include fewer, additional, and/or different operations or features, performed in a similar or different order. At least some variations to the example method shown in FIG. 5 may be or become apparent, for example, from features that are disclosed above, with reference to any of FIGS. 1-4 and apparatus embodiments.

The present disclosure shows, by way of example, how power can be supplied to local electrical circuits, which include one or more electrical loads and one or more power sources, from a utility grid while also preventing power from flowing from the power source(s) to the utility grid.

What has been described is merely illustrative of the application of principles of embodiments of the present disclosure. Other arrangements and methods can be implemented by those skilled in the art.

For example, other arrangements may refer to the use of various types of switches including semiconductors and the use of sensors for sensing power.

Embodiments need not include all elements or components that are shown in the drawings or described herein. Embodiments may include additional, fewer, and/or different components or elements.

It should also be appreciated that features disclosed herein in the context of a particular embodiment, such as an apparatus embodiment, are not limited only to that embodiment. Features may also or instead be implemented in other embodiments, such as a method embodiment. Similarly, method features may also or instead be implemented, supported, or otherwise provided in apparatus embodiments.

In addition, although described primarily in the context of methods and apparatus such as power circuits, other implementations are also contemplated, as instructions stored on a non-transitory computer-readable medium, for example.

The invention claimed is:

1. An apparatus comprising:

a controllable switch coupled between:

an electrical circuit connector for connection to an electrical circuit that comprises an electrical load and an electrical power source connected to the electrical load to provide electrical power to the electrical load, and an electrical grid connector for connection to an electrical utility grid; and a power flow controller, coupled to the controllable switch, to control a connection state between:

a closed connection state to connect the electrical grid to the electrical circuit that comprises the electrical load and the electrical power source connected to the electrical load, and an open connection state to disconnect the electrical grid from the electrical circuit that comprises the electrical load and the electrical power source connected to the electrical load, by controlling the controllable switch based on both of the following to prevent reverse power flow, from the electrical power source in the electrical circuit to the electrical grid:

respective voltages at the electrical circuit connector and at the electrical grid connector, and a state of power flow between the electrical grid connector and the electrical circuit connector, wherein the state of power flow comprises one of:

a state of no power flow with the controllable switch in an open position;

a state of positive power flow from the electrical grid connector to the electrical circuit connector with the controllable switch in a closed position, wherein the power flow controller is configured to control the connection state to prevent reverse power flow, from the electrical power source in the electrical circuit to the electrical grid, by:

maintaining the connection state of the open connection state with the controllable switch in an open position where the respective voltages and the state of power flow do not satisfy the following conditions for the electrical circuit to be connected to the electrical utility grid:

the voltage at the electrical grid connector is greater than the voltage at the electrical circuit connector, under the state of no power flow; and the respective voltages are substantially equal with slopes that have the same polarity, under the state of no power flow;

changing the connection state of the open connection state with the controllable switch in an open position to the closed connection state with the controllable switch in a closed position where the respective voltages and the state of power flow satisfy the following conditions for the electrical circuit to be connected to the electrical utility grid:

the voltage at the electrical grid connector is greater than the voltage at the electrical circuit connector, under the state of no power flow; and the respective voltages are substantially equal with slopes that have the same polarity, under the state of no power flow;

maintaining the connection state of the closed connection state with the controllable switch in a closed position where the respective voltages and the state of power flow satisfy the following condition for the electrical circuit to remain connected to the electrical utility grid:

the respective voltages are substantially equal and positive power flow from the electrical grid connector to the electrical circuit connector is above a positive power flow threshold; and changing the connection state of the closed connection state with the controllable switch in a closed position to the open connection state with the controllable switch in an open position where the respective voltages and the state of power flow do not satisfy the following condition for the electrical circuit to remain connected to the electrical utility grid:

the respective voltages are substantially equal and positive power flow from the electrical grid connector to the electrical circuit connector is above the positive power flow threshold.

2. The apparatus of claim 1, further comprising:

a first voltage sensor, coupled to the power flow controller, to determine the voltage at the electrical grid connector;

a second voltage sensor, coupled to the power flow controller, to determine the voltage at the electrical circuit connector.

3. The apparatus of claim 1, further comprising:

a voltage sensor, coupled to the power flow controller, to determine the voltage at the electrical grid connector and the voltage at the electrical circuit connector.

4. The apparatus of claim 1, further comprising:

a current sensor, coupled to the power flow controller, to determine current between the electrical grid connector and the electrical circuit connector.

5. The apparatus of claim 1, wherein the power flow controller is configured to determine the power flow from the respective voltages and current between the electrical grid connector and the electrical circuit connector.

6. The apparatus of claim 1, further comprising:

a power flow calculator, coupled to the power flow controller, to determine the power flow from the respective voltages and current between the electrical grid connector and the electrical circuit connector.

7. A method comprising:

determining respective voltages at:

an electrical circuit connector for connection to an electrical circuit that comprises an electrical load and an electrical power source connected to the electrical load to provide electrical power to the electrical load, and an electrical grid connector for connection to an electrical utility grid;

determining a state of power flow between the electrical grid connector and the electrical circuit connector;

controlling a connection state between:

a closed connection state to connect the electrical grid to the electrical circuit that comprises the electrical load and the electrical power source connected to the electrical load, and an open connection state to disconnect the electrical grid from the electrical circuit that comprises the electrical load and the electrical power source connected to the electrical load, by controlling a controllable switch coupled between the electrical circuit connector and the electrical grid connector based on both of the following to prevent reverse power flow, from the electrical power source in the electrical circuit to the electrical grid:

the respective voltages at the electrical circuit connector and at the electrical grid connector, and the state of power flow, wherein the state of power flow comprises one of:

a state of no power flow with the controllable switch in an open position;

a state of positive power flow from the electrical grid connector to the electrical circuit connector with the controllable switch in a closed position, wherein the controlling comprises controlling the connection state to prevent reverse power flow, from the electrical power source in the electrical circuit to the electrical grid, by:

maintaining the connection state of the open connection state where the respective voltages and the state of power flow do not satisfy the following conditions for the electrical circuit to be connected to the electrical utility grid:

the voltage at the electrical grid connector is greater than the voltage at the electrical circuit connector, under the state of no power flow; and the respective voltages are substantially equal with slopes that have the same polarity, under the state of no power flow;

changing the connection state of the open connection state to the closed connection state where the respective voltages and the state of power flow satisfy the following conditions for the electrical circuit to be connected to the electrical utility grid:

the voltage at the electrical grid connector is greater than the voltage at the electrical circuit connector, under the state of no power flow; and the respective voltages are substantially equal with slopes that have the same polarity, under the state of no power flow;

maintaining the connection state of the closed connection state with the controllable switch in a closed position where the respective voltages and the state of power flow satisfy the following condition for the electrical circuit to remain connected to the electrical utility grid:

the respective voltages are substantially equal and positive power flow from the electrical grid connector to the electrical circuit connector is above a positive power flow threshold; and changing the connection state of the closed connection state with the controllable switch in a closed position to the open connection state with the controllable switch in an open position where the respective voltages and the state of power flow do not satisfy the following condition for the electrical circuit to remain connected to the electrical utility grid:

the respective voltages are substantially equal and positive power flow from the electrical grid connector to the electrical circuit connector is above the positive power flow threshold.

8. The method of claim 7, wherein determining the respective voltages comprises sensing the respective voltages.

9. The method of claim 7, wherein determining the respective voltages comprises receiving signals indicative of the respective voltages from one or more voltage sensors.

10. The method of claim 7, further comprising:

determining current between the electrical grid connector and the electrical circuit connector.

11. The method of claim 7, further comprising:

determining the power flow from the respective voltages and current between the electrical grid connector and the electrical circuit connector.

* * * * *